(12) United States Patent
Chandrasekhar et al.

(10) Patent No.: US 10,498,645 B2
(45) Date of Patent: *Dec. 3, 2019

(54) LIVE MIGRATION OF VIRTUAL MACHINES USING VIRTUAL BRIDGES IN A MULTI-ROOT INPUT-OUTPUT VIRTUALIZATION BLADE CHASSIS

(71) Applicant: Dell Products L.P., Round Rock, TX (US)

(72) Inventors: Babu Chandrasekhar, Round Rock, TX (US); Michael Brundridge, Georgetown, TX (US); Syama Poluri, Round Rock, TX (US); William Lynn, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 712 days.

This patent is subject to a terminal disclaimer.

(21) Appl. No.: 14/926,193

(22) Filed: Oct. 29, 2015

(65) Prior Publication Data

US 2016/0048411 A1 Feb. 18, 2016

Related U.S. Application Data

(63) Continuation of application No. 13/715,941, filed on Dec. 14, 2012, now Pat. No. 9,218,303.

(51) Int. Cl.
*H04L 12/713* (2013.01)
*G06F 9/48* (2006.01)
(Continued)

(52) U.S. Cl.
CPC .......... *H04L 45/586* (2013.01); *G06F 9/4856* (2013.01); *G06F 9/5077* (2013.01);
(Continued)

(58) Field of Classification Search
CPC ...... G06F 9/45558; G06F 9/5077; G06F 9/00; G06F 9/4856; G06F 13/00;
(Continued)

(56) References Cited

U.S. PATENT DOCUMENTS

9,218,303 B2 * 12/2015 Chandrasekhar ......... G06F 9/00
2009/0248973 A1 * 10/2009 Deshpande ......... G06F 13/4226
711/108
(Continued)

*Primary Examiner* — Lance Leonard Barry
(74) *Attorney, Agent, or Firm* — Jackson Walker L.L.P.

(57) ABSTRACT

A system including first and second information handling systems may implement: a virtual bridge associated with a network information handling resource, a virtual machine to access the resources of the first information handling system; a virtualization environment to migrate the virtual machine from the first to the second information handling system using the virtual bridge; a first virtual function mapping the network information handling resource and the first information handling system; a second virtual function mapping the network information handling resource and the second information handling system; and a physical function mapping the network information handling resource and a chassis management controller. The physical function may be a Peripheral Component Interconnect Express (PCIe) I/O Virtualization (IOV) physical function.

20 Claims, 5 Drawing Sheets

(51) Int. Cl.
*H04L 12/46* (2006.01)
*G06F 9/50* (2006.01)
*H04L 12/24* (2006.01)

(52) U.S. Cl.
CPC ........ *H04L 12/4625* (2013.01); *H04L 41/145* (2013.01); *G06F 2209/461* (2013.01)

(58) Field of Classification Search
CPC ... G06F 2009/45579; G06F 2009/4557; G06F 2009/45595; G06F 2209/461; H04L 45/586; H04L 41/145; H04L 12/4625
See application file for complete search history.

(56) References Cited

U.S. PATENT DOCUMENTS

| | | | |
|---|---|---|---|
| 2010/0031258 A1* | 2/2010 | Takano | G06F 9/4856 718/1 |
| 2010/0257269 A1* | 10/2010 | Clark | G06F 9/4856 709/226 |
| 2011/0243146 A1* | 10/2011 | Armstrong | H04L 45/586 370/401 |
| 2011/0299424 A1* | 12/2011 | Rikitake | H04L 12/4625 370/254 |
| 2012/0005344 A1* | 1/2012 | Kolin | H05K 7/20836 709/226 |
| 2013/0298126 A1* | 11/2013 | Nakagawa | G06F 9/455 718/1 |
| 2014/0173072 A1 | 6/2014 | Chandrasekhar et al. | |
| 2014/0223435 A1* | 8/2014 | Chang | G06F 9/45533 718/1 |
| 2014/0373012 A1* | 12/2014 | Ylitalo | G06F 9/45558 718/1 |

* cited by examiner

LIVE MIGRATION OF VIRTUAL MACHINES USING VIRTUAL BRIDGES IN A MULTI-ROOT INPUT-OUTPUT VIRTUALIZATION BLADE CHASSIS

The present patent application is a continuation of a previously filed patent application, U.S. patent application Ser. No. 13/715,941, filed Dec. 14, 2012, issued as U.S. Pat. No. 9,218,303 on Dec. 22, 2015, the entirety of which is hereby incorporated by reference.

TECHNICAL FIELD

The present disclosure relates in general to information handling systems, and more particularly to live migration of virtual machines using virtual bridges in a multi-root input-output virtualization blade chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system and input/output ("I/O") resources at a time, or bulky blade server chassis providing multiple servers and I/O control modules in a single chassis. A system chassis with multiple information handling systems with various peripheral and input/output capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and input/output capabilities common to the chassis as a whole presents numerous challenges.

SUMMARY

In accordance with the teachings of the present disclosure, the disadvantages and problems associated with removal of information handling resources in a shared input/output infrastructure have been reduced or eliminated.

In accordance with some embodiments of the present disclosure, a system includes a chassis, one or more switches, a virtual bridge, a virtual machine, and a virtualization environment. The chassis is configured to receive a first information handling system, a second information handling system, and a plurality of information handling resources including a network information handling resource. Each information handling resource is received through a slot in the chassis. The switches are configured to virtualize access of the network information handling resource to the first information handling system and the second information handling system, wherein the first information handling system and the second information handling system share the network information handling resource using the virtualized access. The virtual bridge is associated with the network information handling resource. The virtual machine is configured to access the resources of the first information handling system. The virtualization environment is configured to migrate the virtual machine from the first information handling system to the second information handling system using the virtual bridge.

In other embodiments, a method for managing migration of a virtual machine includes accessing a first information handling system and a second information handling system, accessing a network information handling resource, using one or more switches to virtualize access of the network information handling resource to the first information handling system and the second information handling system, accessing a virtual bridge associated with the network information handling resource, accessing a virtual machine configured to access the resources of the first information handling system, and copying the operational state of the virtual machine from the first information handling system to the second information handling system using the first virtual bridge. The first information handling system and the second information handling system share the network information handling resource using the virtualized access.

In yet other embodiments, an article of manufacture includes a computer readable medium and computer-executable instructions carried on the computer readable medium. The instructions are readable by a processor. The instructions, when read and executed, cause the processor to access a first information handling system and a second information handling system, access a network information handling resource, use one or more switches to virtualize access of the network information handling resource to the first information handling system and the second information handling system, access a virtual bridge associated with the network information handling resource, access a virtual machine configured to access the resources of the first information handling system, and copy the operational state of the virtual machine from the first information handling system to the second information handling system using the virtual bridge. The first information handling system and the second information handling system share the network information handling resource using the virtualized access.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components or the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

Figure 1:
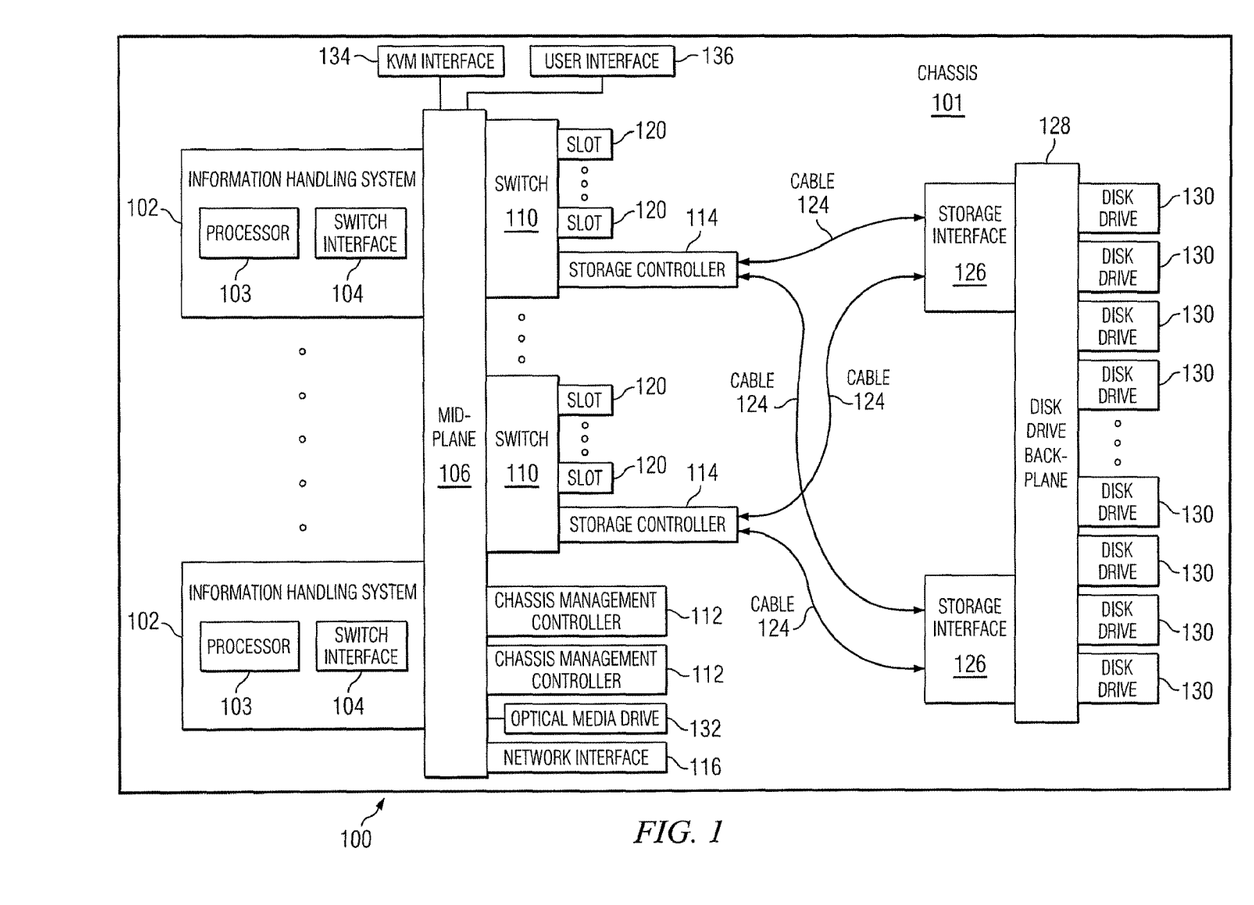
FIG. 1 illustrates a block diagram of an example system chassis with multiple information handling systems and with various peripheral and input/output capabilities common to the chassis as a whole, in accordance with certain embodiments of the present disclosure.

FIG. 1 illustrates a block diagram of an example system 100 having a chassis 101 with multiple information handling systems 102 and with various peripheral and input/output capabilities common to chassis 101 as a whole, in accordance with certain embodiments of the present disclosure. System 100 may be configured to provide live migration of virtual machines using virtual bridges between information handling systems 102. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, and a user interface 136.

An information handling system 102 may generally be operable to receive data from and/or communicate data to one or more disk drives 130 and/or other information handling resources of chassis 101 via mid-plane 106. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and one or more switch interfaces 104 communicatively coupled to processor 103.

A processor 103 may include any system, device, or apparatus configured to interpret and/or execute program instructions and/or process data, and may include, without limitation a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a hard drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express ("PCIe") switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 102 for redundancy, high availability, and/or other reasons.

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

A chassis management controller 112 may be any system, device, or apparatus configured to facilitate management and/or control of system 100, its information handling systems 102, and/or one or more of its component its component information handling resources. A chassis management controller 102 may be configured to issue commands and/or other signals to manage and/or control information handling system 102 and/or information handling resources of system 100. A chassis management controller 112 may comprise a microprocessor, microcontroller, DSP, ASIC, field programmable gate array ("FPGA"), EEPROM, or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller may define configurations of the storage subsystem (e.g., storage controllers 114, storage interfaces 126, disk drives 130, etc.) of system 100. For example, a chassis management controller may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Intelligent Platform Management Interface ("IPMI") or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or parameters associated with operation of system 100 and its various information handling resources (e.g., power usage, processor allocation, memory allocation, security privileges, etc.). Although FIG. 1 depicts chassis as having two chassis management controllers 112, chassis 101 may include any suitable number chassis management controllers 112.

A storage controller 114 may and include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), input/output routing, and error detection and recovery. As shown in FIG. 1, a storage controller 114 may coupled to a connector on mid-plane 106. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically couple such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low-profile to mid-plane 106, a switch 110, or other components, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or other suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface may serve to permit a relatively small number of communication links (e.g., two) between storage controllers 114 and storage interfaces 126 to communicate with greater number (e.g., 25) disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

When a system (e.g., system 100) is architected so as to allow information handling information handling resources (e.g., Peripheral Component Interconnect Express ("PCIe") adapters coupled to slots 120) to be located in a chassis having shared resources such that the information handling resources may be assigned to one information handling system or shared among a plurality of information handling resources, challenges may arise when needing to service an information handling resource.

Shared resources or devices, such as PCIe adapters coupled to slots 120, may be virtualized across multiple information handling systems 102. Non-shared resources or devices may be partitioned such that they are visible only to a single information handling system 102 at time. Chassis management controller 112 may be configured to handle routing and switching through switches 110 to affect sharing or a resource to multiple information handling systems 102 or to affect dedicated assignment of a resource to a single information handling system 102.

Figure 2:
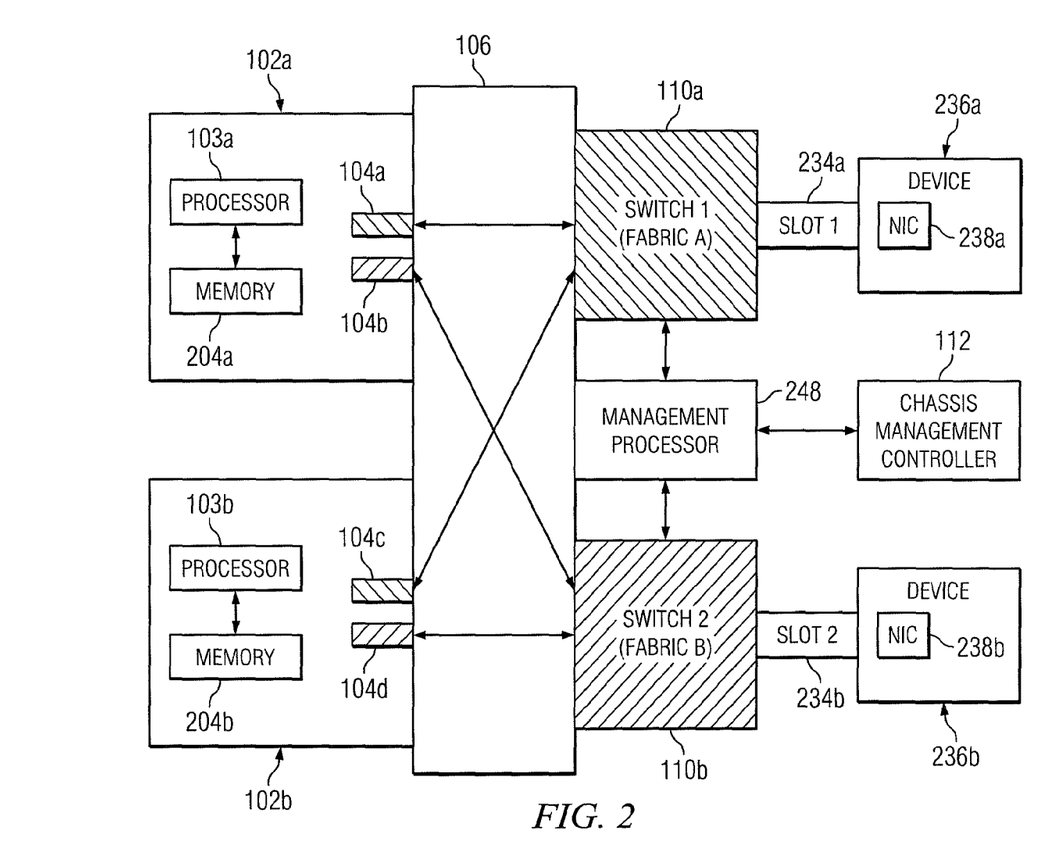
FIG. 2 illustrates a more detailed block diagram of example system configured to conduct live migration of virtual machines in a modular chassis for information handling systems in accordance with certain embodiments of the present disclosure.

FIG. 2 illustrates a more detailed block diagram of example system 100 configured to conduct live migration of virtual machines in modular chassis 101 for information handling systems 102 in accordance with certain embodiments of the present disclosure. In one embodiment, system 100 may be configured to perform such live migration utilizing the single root IOV configuration of a NIC.

Chassis 101 may include a management processor 248 communicatively coupled to switches 110. Management processor 248 may be any system, device, or apparatus configured to facilitate management and/or control of switches 110. Management processor 248 may be configured to issue commands and/or other signals to switches 110. Management processor 248 may comprise a microprocessor, microcontroller, DSP, ASIC, EEPROM, or any combination thereof. In one embodiment, management processor 248 may be coupled to chassis management controller 112. In another embodiment, management processor 248 may be implemented by or within the same subsystem as chassis management controller 112.

Management processor 248 may include application-programming-interfaces ("APIs") for supporting configuration of IOV in system 100 for sharing devices connected to slots of chassis 101 to multiple information handling systems 102 and for mapping devices that are to be dedicated to a single information handling system 102. Such APIs may be executed on, for example, a Linux operating system running on management processor 248. The APIs of management processor 248 may provide the interface to chassis management controller 112 for configuring IOV. Management processor 248 may be configured to manage both switches 110.

Chassis 101 may include multiple information handling systems 102. Chassis 101 may include any suitable number of information handling systems 102. In one embodiment, information handling systems 102 may be referred to as "blades".

Each information handling system 102 may include cards 104, as described in association with FIG. 1. Information handling systems 102 may include a basic input-output system 246 ("BIOS") which may be implemented, for example, on firmware for execution by the information handling system. Information handling system 102 may access BIOS upon, for example, start-up of information handling system 102 to initialize interoperation with the rest of chassis 101.

The processor 103 of information handling system 102 may be coupled to a memory 204. In one embodiment, memory 204 may be resident on information handling system 102. In another embodiment, memory 204 may be shared among multiple information handling systems 102 and resident elsewhere on chassis 101. Applications, processes, and other software executing on information handling system 102 may be performed by instructions resident in memory 204 for execution by processor 103. Memory 204 may be implemented by non-transitory computer-readable media, such as RAM.

Switches 110 may contain PCIe cards instead of typical blade Ethernet, Fibre Channel or InfiniBand cards. Interfaces 104 of the information handling systems 102 may attach to switches 110 through the cards of switches 110. Switches 110 may connect information handling systems 102 to slots 234. Slots 234 may include one or more of the slots 120 of FIG. 1 in any suitable combination.

In one embodiment, each of information handling systems 102 may be communicatively coupled to each of switches 110 through one of interfaces 104 resident on the information handling system 102. For example, information handling system 102*a* may be communicatively coupled to switch 110*a* through interface 104*a* and to switch 110*b* through interface 104*b*. Information handling system 102*b* may be communicatively coupled to switch 110*a* through interface 104*c* and to switch 110*b* through interface 104*d*. Thus, each of switches 110 may provide its switching fabric to each of information handling systems 102 in order to route the given information handling system 102 to respective slots 234 associated with the switch 110.

Slots 234 may be configured to connect to associated devices 236, though fewer devices may be present than the associated capacity of chassis 101. Chassis 101 may include any suitable number of slots 234. In one embodiment, devices 236 may include PCIe-based cards or devices. Each such device 236 may represent an information handling resource to be selectively, for example, shared among multiple information handling system 102 or dedicated to a single information handling system 102. Device 236 may comprise, for example, a RAID controller, network card, or other information handling resource. Furthermore, device 236 may include a specific shared component such as a NIC 238.

In order to support IOV, the driver and firmware of device 236 may include support for single root IOV. To maintain routes between given information handling systems 102 and slots 234, switches 110 may include virtual hierarchies from slots 234 to information handling systems 102. Particular functions, such as virtual functions or shared functions, for single root IOV for a given device 236 may be mapped in switch 110, providing behavior similar to multiple-root IOV. In one embodiment, wherein device 236 contains multiple information handling resources such as a NIC and USB interface, a function may be provided for each such information handling resource. Thus, from the perspective of information handling systems 102 the multiple such information handling resources may appear to be separate and unrelated. A given slot 234 or device 236 which has been virtualized may be accessed by two or more virtual functions, which allow the sharing of the resource. Physical functions, as opposed to the above-described virtual functions or shared functions, may be mapped or stored in management processor 248. A physical function representing an information handling resource may be provided to a single information handling system 102. In cases where a device 236 contains multiple information handling resources, individual physical functions may be provided for each such resource. Multiple instances of a virtual function may be provided to multiple information handling systems 102. If, for example, multiple information handling systems 102 are sharing a device 236, then access to device 236 may be divided into multiple virtual NICs using virtual functions, each of which are mapped by switches 110 to the respective information handling system 102. Furthermore, specific APIs for accessing a given device 236 may be mapped or stored in management processor 248. Chassis management controller 112 may be configured to access these physical functions or APIs in management processor 248.

Chassis management controller 112 and/or management processor 248 may be configured to route, switch, control, or otherwise direct other components of chassis 101 to route, switch, or control information between devices 236 and information handling systems 102. Such routing may be used to provide live migration of a virtual machine between, for example, information handling system 102a and information handling system 102b. Any suitable method of live migration may be used. The transfer of operational statuses such as execution point, memory contents, operating system state, etc., may be conducted through the virtualized access of information handling resources such as NIC 238a.

In operation, a single root IOV information handling resource such as NIC 238a may be communicatively coupled to multiple information handling systems, such as information handling system 102a and information handling system 102b.

Using virtual bridges, each of information handling system 102a and information handling system 102b may appear as possible network destinations from each other, despite being connected to the same NIC. The virtual bridges route traffic between information handling system 102a and information handling system 102b that, to the information handling systems 102, may appear to be normal network traffic, such as Ethernet traffic using Transmission Control Protocol/Internet Protocol ("TCP/IP"). However, the traffic might not be issued to transport equipment and instead routed to the other information handling system 102, which may view the received information as received using normal network transport mechanisms such as described above. The connection between information handling systems 102 may be performed through mid-plane 106 as facilitated by switches 110. In one embodiment, no additional network connections external to chassis 101 may be necessary to provide such connectivity. In another embodiment, network connections external to chassis 101 may be used to force device drivers, such as legacy drivers for applications and operating systems that assume dedication of information handling resources such as NIC 238, to detect links or traffic on NIC 238 and may cause NIC 238 to function as a network switch.

Using the connection over midplane 106, a virtual machine may be transferred between information handling system 102a and information handling system 102b while preserving the execution state of the virtual machine. Such a transfer may be conducted using the connection over midplane 106 while such a connection is transparent to the entity conducting the migration. Consequently, the entity conducting the migration may perform migration with assumptions concerning network transport in place.

In one embodiment, the entity conducting the migration may reside on the source information handling system 102. In another embodiment, the entity conducting the migration may reside on an information handling system 102 that is a third party to the source and destination information handling systems. In yet another embodiment, the entity conducting the migration may reside on other portions of chassis 101, such as chassis management controller 112 or a module communicatively coupled thereto. In still yet another embodiment, the entity conducting the migration may reside on an information handling system separate from chassis 101 and communicatively coupled to chassis 101 over a network.

Figure 3:
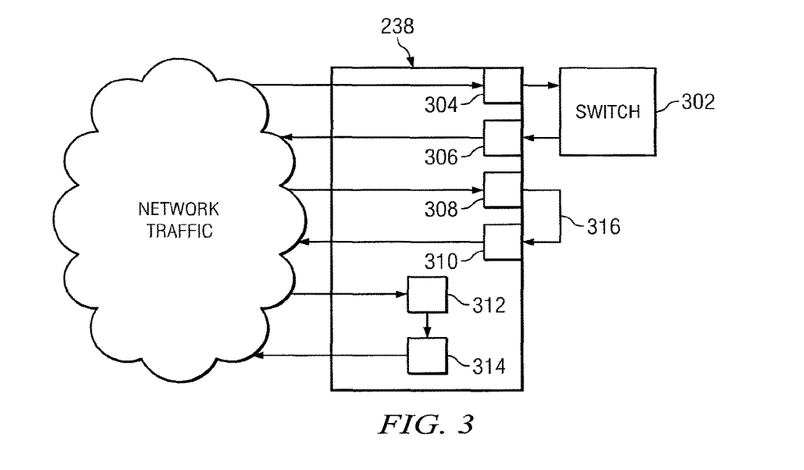
FIG. 3 illustrates a more detailed block diagram of mechanisms to connect a single-root input-output-virtualization network interface card to simulate local-area-network activity in accordance with certain embodiments of the present disclosure.

FIG. 3 illustrates a more detailed block diagram of mechanisms to connect a single-root IOV NIC to simulate local-area-network ("LAN") activity in accordance with certain embodiments of the present disclosure. Such simulation may cause drivers to detect links or traffic on the NIC and cause it to function as a network switch, as described above. The single-root IOV NIC may include, for example, NIC 238.

NIC 238 may include a plurality of ports, such as ports 304, 306, 308, 310, 312, 314. Any suitable number of ports may be included within NIC 238. Although six ports are illustrated in the example of FIG. 3, such a number of ports are merely shown for illustrative purposes. In one embodiment, NIC 238 may include four physical ports. Ports 304, 306, 308, 310, 312, 314 may be bi-directional, though for the purposes of illustration in FIG. 3 the ports are shown in uni-directional operation.

In one embodiment, NIC 238 may be connected to a switch 302 external to chassis 101. Switch 302 may include any suitable network switch. NIC 238 may be connected to the switch using ports 304, 306. In a further embodiment, although switch 302 is communicatively coupled to NIC 238, live migration of a virtual machine from information handling system 102a to information handling system 102b may be conducted without transmitting any of the virtual machine state information through switch 302. In such a case, the connection of ports 304, 306 to switch 302 may cause drivers and applications for conducting the live migration to believe that a connection is available. Nevertheless, traffic related to transmitting the virtual machine state information may be switched between information handling system 102*a* and information handling system 102*b* internal to chassis 101. Such traffic may be switched, for example, by switches 110 on midplane 106.

In another embodiment, NIC 238 may be connected to itself using a loopback, crossover, or other mechanism such as loopback 316*a*. Loopback 316*a* may be external to chassis 101. Loopback 316*a* may be connected to the switch using ports 308, 310. The live migration of a virtual machine from information handling system 102*a* to information handling system 102*b* may be conducted without transmitting any of the virtual machine state information through loopback 316. In such a case, the connection of ports 308, 310 to loopback 316 may cause drivers and application for conducting the live migration to believe that a connection is available. Nevertheless, traffic related to transmitting the virtual machine state information may be switched between information handling system 102*a* and information handling system 102*b* internal to chassis 101. The traffic may not reach the ports of NIC 238. Such traffic may be switched, for example, by switches 110 on midplane 106.

In yet another embodiment, NIC 238 may be connected to itself using a loopback, crossover, or other mechanism internal to NIC 238. Such a loopback may be connected using ports 312, 314. In a further embodiment, ports 312, 314 may be hard-wired to each other. In another further embodiment, ports 312, 314 may not be externally available. The live migration of a virtual machine from information handling system 102*a* to information handling system 102*b* may be conducted without transmitting any of the virtual machine state information through the connection between ports 312, 314. In such a case, the connection of ports 312, 314 in loopback configuration may cause drivers and applications for conducting the live migration to believe that a connection is available. Nevertheless, traffic related to transmitting the virtual machine state information may be switched between information handling system 102*a* and information handling system 102*b* internal to chassis 101. The traffic may not reach the ports of NIC 238, including ports 312, 314. Such traffic may be switched, for example, by switches 110 on midplane 106.

In still yet another embodiment, NIC 238 may be configured, through driver software, for example, to ignore the status of its ports when determining whether NIC 238 is connected to a destination. Thus, driver software for applications of information handling system 102*a* may be bound to particular to network ports of NIC 238 despite the actual connection status of such ports. A connection may be simulated to a virtualization environment on information handling system 102*a*.

The live migration of a virtual machine from information handling system 102*a* to information handling system 102*b* may be conducted without transmitting any of the virtual machine state information through the connection between the ports of NIC 238. In such a case, such a status may cause other drivers and applications for conducting the live migration to believe that a connection is available from NIC 238, when such an external connection may or may not be available. Nevertheless, traffic related to transmitting the virtual machine state information may be switched between information handling system 102*a* and information handling system 102*b* internal to chassis 101. The traffic may not reach the ports of NIC 238. Such traffic may be switched, for example, by switches 110 on midplane 106.

Figure 4:
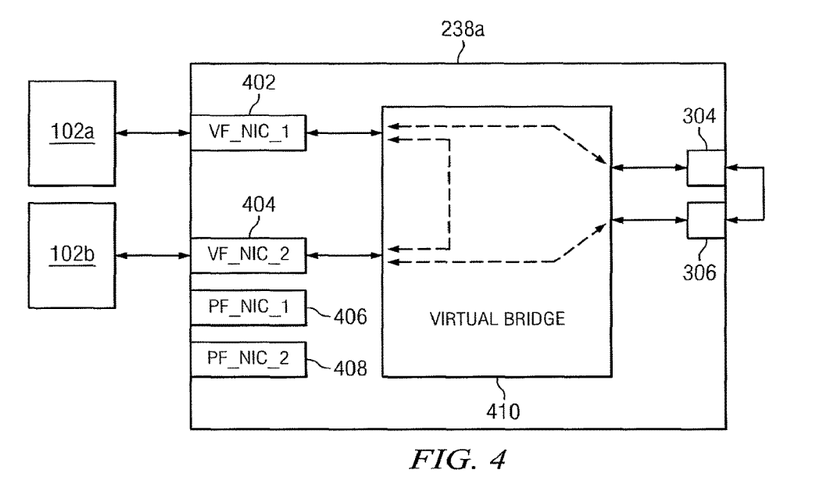
FIG. 4 illustrates a more detailed block diagram of virtual hierarchies provided by a chassis that may be used to provided live migration of virtual machines in accordance with certain embodiments of the present disclosure.

FIG. 4 illustrates a more detailed block diagram of virtual hierarchies provided by chassis 101 that may be used to provide live migration of virtual machines in accordance with certain embodiments of the present disclosure. Such virtual hierarchies may represent routing of signals by switches 110 between information handling systems 102 and between information handling systems 102 and information handling resources such as NIC 238*a*.

The virtual hierarchies may include one or more virtual bridges 410 for routing, transmitting, or otherwise facilitating network traffic on chassis 101. Such a virtual bridge 410 may be resident within, for example, NIC 238*a*. Virtual bridge 410 may include an embedded virtual bridge. Virtual bridges 410 may be configured to provide the appearance of network entities for routing information configured as, for example, TCP/IP traffic, while forgoing the use of network transmission equipment.

Furthermore, the virtual hierarchies may include mappings of information handling resources such as NIC 238*a* to one or more information handling systems 102. Each information handling resource of a given device may include a set of functions. Such a set of functions may include a physical function, for which actual physical control may be provided, and one or more virtual functions, for which shared access may be provided.

For example, NIC 238*a* may be configured to be shared among multiple information handling systems, and consequently may include physical functions PF_NIC_1 406, PF_NIC_2 408 and virtual functions VF_NIC_1 402, VF_NIC_2 404.

In the example of FIG. 4, NIC 238*a* may include virtual bridge 410, which may route VF_NIC_1 402 to VF_NIC_2 404 and vice versa. Such a routing may be handled in any suitable manner, such as the mechanisms illustrated in FIG. 3. In one embodiment, such a routing may be handled internally to virtual bridge 410. In another embodiment, such a routing may be made by routing VF_NIC_1 402 and VF_NIC_2 404 to suitable ports of NIC 238*a*, such as ports 304, 306, respectively. Ports 304, 306 may be connected using a crossover connection or an external switch.

In operation, the physical operation of NIC 238*a* may be routed to chassis management controller 112, which may in turn establish the virtual function mappings shown in FIG. 4. Information handling system 102*a* may utilize NIC 238*a* by use of virtual functions VF_NIC_1 402, VF_NIC_2 404. Furthermore, information handling system 102*a* and information handling system 102*b* may communicate by identifying each other through use of virtual bridge 410 sending network traffic between the functions of virtual bridge 410.

Traffic from information handling system 102*a* may be received by VF_NIC_1 402 and routed using virtual bridge 410 to VF_NIC_2 404 and on to information handling system 102*b*. The routing of traffic may be handled by, for example, internal routing of data in virtual bridge 410 or by external routing to ports 304, 306. Such routing may appear seamless to applications and functions on each of information handling system 102*a* and information handling system 102*b*, which may each perceive a unique NIC through which traffic is being conducted through virtual functions VF_NIC_1 402, VF_NIC_2 404.

Figure 5:
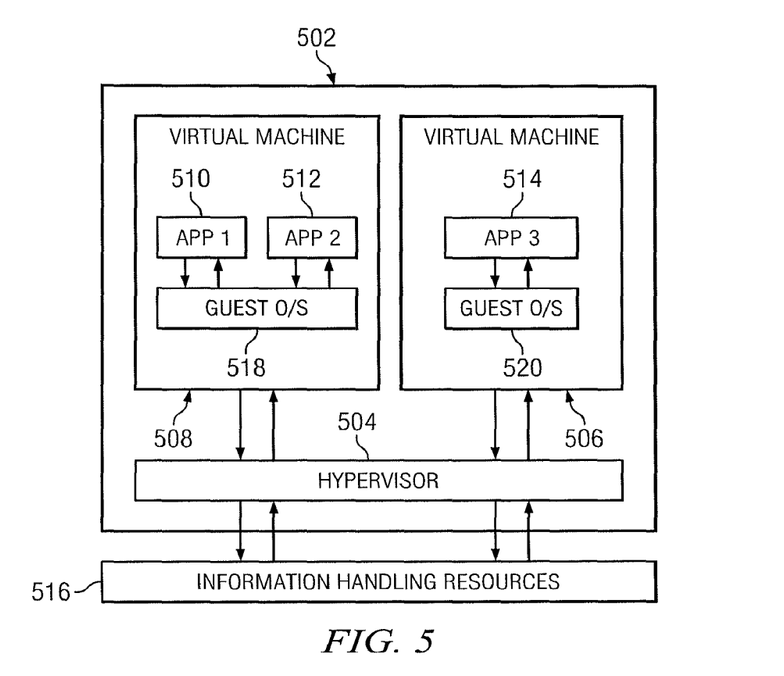
FIG. 5 illustrates a block diagram of example virtual machine operation in accordance with certain embodiments of the present disclosure.

FIG. 5 illustrates a block diagram of example virtual machine operation in accordance with certain embodiments of the present disclosure. Although example virtual machine operation is illustrated in FIG. 5, any suitable virtual machine may be migrated using chassis 101.

A virtualization environment 502 may provide virtualized access for one or more applications such as App1 510, App2 512, and App3 514 to information handling resources 516. Information handling resources 516 may include the resources, such as processors, storage, or memory, of one or more information handling systems, such as information handling systems 102. Applications 510, 512, 514 may include drivers, scripts, executable, user programs provided remotely, on a cloud, or a service, or any other suitable component for execution on a computer. Applications 510, 512, 514 may each perceive resources available to the application. However, attempts to access the resources may be intercepted by virtualization environment 502, which may handle the actual access of resources. The resources actually accessed may include information handling resources 516. Information handling resources 516 might thus not be visible to applications 510, 512, 514. Instead, only virtualized views or versions of information handling resources 516 may be visible to applications 510, 512, 514.

Virtualization environment 502 may include any suitable number and kind of components to provide virtualized access for applications 510, 512, 514 to information handling resources 516. For example, virtualization environment 502 may include a hypervisor 504, configured to coordinate the virtualization and allocation of resources to various applications 510, 512, 514. Hypervisor 504 may include any module, library, application, or other entity configured to manager virtual machines or environments, such as virtual memory manager or VCENTER. Further, virtualization environment 502 may include multiple execution environments such as virtual machines 508, 510. Each such virtual machine 508, 510 may include a self-contained execution environment for a set of applications. For example, virtual machine 508 may provide an execution environment for App1 510 and App2 512. In another example, virtual machine 506 may provide an execution environment for App4 514. The elements executing within virtual machine 506 may not be visible to the elements executing within virtual machine 508, and vice-versa. Each such virtual machine may include a guest operating system 518, 520, configured to provide a mechanism expected by applications 510, 512, 514 for accessing information handling resources 516.

In operation, virtualized environment 502 may be executing on an information handling system 102, elsewhere on chassis 101, or on another information handling system 102 communicatively coupled with chassis 101. Applications 510, 512, 514 may be operating on an information handling system 102. Applications 510, 512, 514 may be accessing resources of the information handling system 102 such as memory 204 or processor 103. Such access may be virtualized by virtualized environment 502.

Virtualized environment 502 may change the specific resources of information handling resources 516 that are provided to a given virtual machine 506, 508. Such a change may be responsive to, for example, a management setting or command, a change in demand for resources or in resource availability, prioritization, or other asset management logic. For example, execution of virtual machine 506 may be moved from information handling system 102a to information handling system 102b. Chassis 101 may provide migration of the virtual machine 506 from information handling system 102a to information handling system 102b. Such a migration may include the preservation of the operation state of virtual machine 506 such that errors in the execution of App1 510 and App2 512 are avoided.

Figure 6:
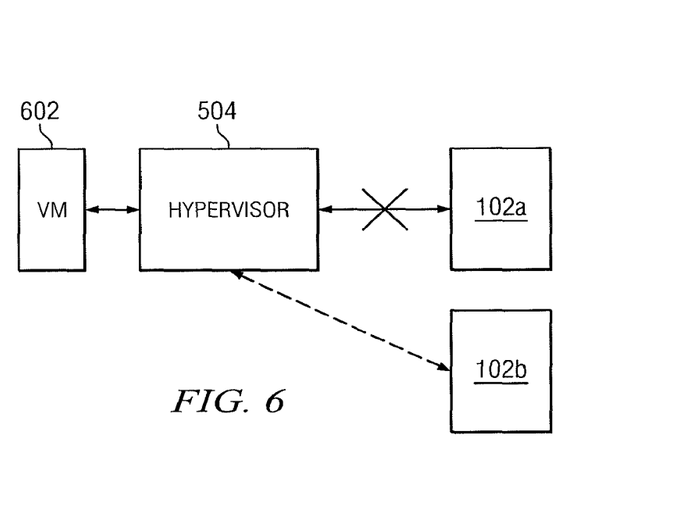
FIG. 6 illustrates a block diagram of example live migration in accordance with certain embodiments of the present disclosure.

FIG. 6 illustrates a block diagram of example live migration in accordance with certain embodiments of the present disclosure. A virtual machine 602, which may implement, for example, virtual machine 506 of FIG. 5, may have been using the resources of information handling system 102a. Hypervisor 504 may preserve the operational state of virtual machine 602 and transfer its execution to the information handling resources of information handling system 102b.

Figure 7:
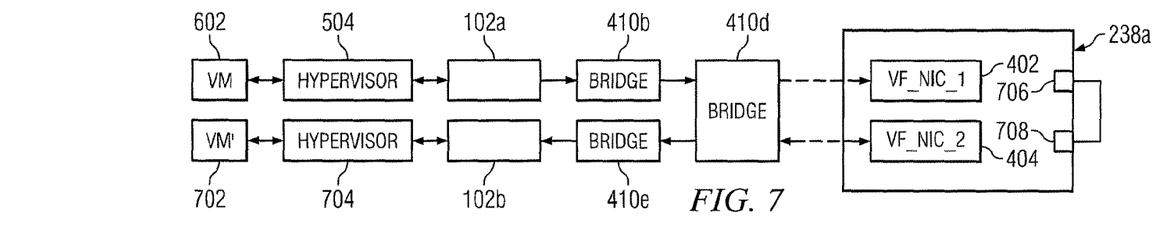
FIG. 7 illustrates a block diagram of a more detailed example of the operation of live migration in accordance with certain embodiments of the present disclosure.

FIG. 7 illustrates a block diagram of a more detailed example of the operation of live migration in accordance with certain embodiments of the present disclosure. Information handling system 102a and information handling system 102b may be communicatively coupled to each other using the process described above in conjunction with FIGS. 3 and 4. Information handling system 102a may access NIC 238 using VF_NIC_1 402 and bridge 410b. Information handling system 102a may access NIC 238 using VF_NIC_2 404 and bridge 410e. Bridges 410b and 410e may be connected using bridge 410d. A loopback, crossover, external switch connection, or other similar configuration as described in FIG. 3 may be implemented with ports 706, 708. Consequently, drivers and applications relying upon the operation of NIC 238, such as those within hypervisor 504, may be configured to transmit information correctly.

In operation, hypervisor 504 may move the operation of virtual machine 602 from the resources of information handling system 102a to the resources of information handling system 102b. Hypervisor 504 may copy or move large amounts of data reflective of the operational state of virtual machine 602 and all of its components. To copy or move such large amounts of data, the data may be sent through bridge 410b, to bridge 410d, and to bridge 410e before be reconstructed and configured to use the resources of information handling system 102b. In one embodiment, hypervisor 504 may reconstruct itself as hypervisor' 704. In another embodiment, hypervisor 504 may remain resident in its original place of operation. Hypervisor 504 may reconstruct virtual machine 602 as hypervisor' 702. The information transmitted to reconstruct virtual machine 602 may be passed through switches 110 and mid-plane 106. In one embodiment, the information transmitted may remain internal to chassis 101 without leaving chassis 101. In another embodiment, the information transmitted may be passed through bridges 410 without reaching NIC 238a.

Figure 8:
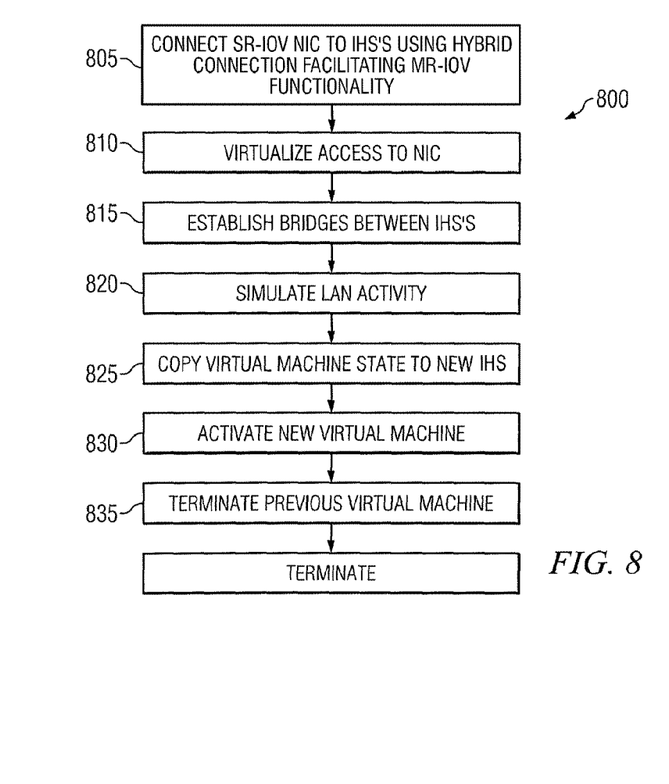
FIG. 8 illustrates a flow chart of an example method for live migration of virtual machines using virtual bridges in a multi-root input-output virtualization blade chassis.

FIG. 8 illustrates a flow chart of an example method 800 for live migration of virtual machines using virtual bridges in a multi-root input-output virtualization blade chassis. According to certain embodiments, method 800 may begin at step 805. As noted above, teachings of the present disclosure may be implemented in a variety of configurations of system 100 as shown in FIGS. 1-7. As such, the preferred initialization point for method 800 and the order of the steps comprising method 800 may depend on the implementation chosen.

Method 800 may begin in response to any suitable stimulus or trigger. For example, method 800 may be invoked in response to an asset management decision, command, configuration, or setting. In another example, method 800 may be invoked after a change in utilization, demand, or other criteria regarding information handling resources. In these and other embodiments, method 800 may be implemented as firmware, software, applications, functions, libraries, or other instructions continually monitoring chassis 101 for such powering on. In a further embodiment, method 800 may be implemented fully or partially by such instructions within chassis management controller 112.

In step 805, an information handling resource may be connected to chassis 101 for access by two or more information handling systems. In one embodiment, such a resource may include a resource configured for single-root IOV. In another embodiment, such a resource may include a NIC.

In step 810, access to the resource may be virtualized. Virtual functions for each information handling system to share the resource may be issued. Each such information handling system may access the resource using the respective virtual function. In step 815, virtual bridges may be established for connecting information handling systems and the resource. A bridge may be created for accessing the resource. Furthermore, a bridge may be created at each of the information handling systems. The bridges may be configured to route information between each other.

In step 820, LAN activity may be simulated. Such a simulation may be accomplished by, for example, creating a loopback or crossover between two ports of the NIC, or by connecting the NIC to an external switch.

In step 825, the operational state of a virtual machine may be copied from the resources of one information handling system to the resources of another information handling system. The copied resources may be transmitted by the bridges created in step 815. In one embodiment, such information may not reach the NIC. In another embodiment, such information may not travel outside chassis 101. Any suitable order or number of steps may be taken to copy the operational state of the virtual machine with regards to the various aspects of the virtual machine.

In step 830, the newly copied or created virtual machine may be activated. The operation of the virtual machine may continue at an execution point at which operation halted before the virtual machine was copied. In step 835, the previous virtual machine may be terminated. After step 835, method 800 may terminate or optionally repeat.

Although FIG. 8 discloses a particular number of steps to be taken with respect to method 800, it may be executed with greater or lesser steps than those depicted in FIG. 8. In addition, although FIG. 8 discloses a certain order of steps to be taken with respect to method 800, the steps comprising method 800 may be completed in any suitable order.

Method 800 may be implemented using system 100, components thereof or any other system such as those shown in FIGS. 1-7 operable to implement method 800. In certain embodiments, method 800 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A system comprising:
   a chassis configured to receive a first information handling system, a second information handling system, and a plurality of information handling resources including a network information handling resource, each information handling resource received through a slot in the chassis; and
   one or more switches configured to virtualize access of the network information handling resource to the first information handling system and the second information handling system, wherein the first information handling system and the second information handling system are configured to share the network information handling resource using the virtualized access;
   wherein the system is configured to implement:
      a first virtual bridge associated with the network information handling resource;
      a virtual machine configured to access the resources of the first information handling system;
      a virtualization environment configured to migrate the virtual machine from the first information handling system to the second information handling system using the first virtual bridge;
      a first virtual function mapping the network information handling resource and the first information handling system;
      a second virtual function mapping the network information handling resource and the second information handling system; and
      a physical function mapping the network information handling resource and a chassis management controller, wherein the physical function is a Peripheral Component Interconnect Express (PCIe) I/O Virtualization (IOV) physical function; and
   wherein the first information handling system and the second information handling system are configured to communicate using the first virtual function, the second virtual function, and the first virtual bridge.

2. The system of claim 1, further comprising a connection between two ports of the network information handling resource, the connection configured to simulate local-area-network activity visible to the virtualization environment.

3. The system of claim 2, wherein traffic resulting from the migration of the virtual machine is isolated from the connection.

4. The system of claim 2, wherein the connection is internal to the network information handling resource.

5. The system of claim 1, further comprising a switch connected to the network information handling resource, the switch configured to simulate local-area-network activity visible to the virtualization environment.

6. The system of claim 5, wherein traffic resulting from the migration of the virtual machine is isolated from the switch.

7. The system of claim 1, wherein the system is further configured to implement:
   a second virtual bridge associated with the first information handling system; and
   a third virtual bridge associated with the second information handling system;
   wherein the first information handling system is configured to communicate with the second information handling system through the second virtual bridge and the third virtual bridge.

8. A method for managing migration of a virtual machine, comprising:
   accessing a first information handling system and a second information handling system;
   accessing a network information handling resource;
   using one or more switches, virtualizing access of the network information handling resource to the first information handling system and the second information handling system, wherein the first information handling system and the second information handling system share the network information handling resource using the virtualized access;
   accessing a first virtual bridge associated with the network information handling resource;

accessing a virtual machine configured to access the resources of the first information handling system; and copying an operational state of the virtual machine from the first information handling system to the second information handling system using the first virtual bridge;

mapping a first virtual function mapping between the network information handling resource and the first information handling system;

mapping a second virtual function between the network information handling resource and the second information handling system;

mapping a physical function between the network information handling resource and a chassis management controller, wherein the physical function is a Peripheral Component Interconnect Express (PCIe) I/O Virtualization (IOV) physical function; and communicating between the first information handling system and the second information handling system using the first virtual function, the second virtual function, and the first virtual bridge.

9. The method of claim 8, further comprising establishing a connection between two ports of the network information handling resource, the connection configured to simulate local-area-network activity.

10. The method of claim 9, further comprising isolating traffic resulting from the migration of the virtual machine from the connection.

11. The method of claim 9, wherein the connection is internal to the network information handling resource.

12. The method of claim 8, further comprising establishing a connection with a switch connected to the network information handling resource, the switch connection configured to simulate local-area-network activity.

13. The method of claim 12, further comprising isolating traffic resulting from the migration of the virtual machine from the switch.

14. The method of claim 8, further comprising:

accessing a second virtual bridge associated with the first information handling system;

accessing a third virtual bridge associated with the second information handling system; and communicating between the first information handling system and the second information handling system through the second virtual bridge and the third virtual bridge.

15. An article of manufacture comprising:

a non-transitory computer readable medium; and computer-executable instructions carried on the computer readable medium, the instructions readable by a processor, the instructions, when read and executed, for causing the processor to:

access a first information handling system and a second information handling system;

access a network information handling resource;

using one or more switches, virtualize access of the network information handling resource to the first information handling system and the second information handling system, wherein the first information handling system and the second information handling system share the network information handling resource using the virtualized access;

access a first virtual bridge associated with the network information handling resource;

access a virtual machine configured to access the resources of the first information handling system;

copy an operational state of the virtual machine from the first information handling system to the second information handling system using the first virtual bridge;

map a first virtual function mapping between the network information handling resource and the first information handling system;

map a second virtual function between the network information handling resource and the second information handling system;

map a physical function between the network information handling resource and a chassis management controller, wherein the physical function is a Peripheral Component Interconnect Express (PCIe) I/O Virtualization (IOV) physical function; and communicate between the first information handling system and the second information handling system using the first virtual function, the second virtual function, and the first virtual bridge.

16. The article of claim 15, wherein the processor is further caused to establish a connection between two ports of the network information handling resource, the connection configured to simulate local-area-network activity.

17. The article of claim 16, wherein the processor is further caused to isolate traffic resulting from the copying of the operational state of the virtual machine from the connection.

18. The article of claim 16, wherein the connection is internal to the network information handling resource.

19. The article of claim 15, wherein the processor is further caused to establish a connection with a switch connected to the network information handling resource, the switch connection configured to simulate local-area-network activity.

20. The article of claim 15, wherein the processor is further caused to:

access a second virtual bridge associated with the first information handling system;

access a third virtual bridge associated with the second information handling system; and communicate between the first information handling system and the second information handling system through the second virtual bridge and the third virtual bridge.

* * * * *